United States Patent
Greenlee et al.

(10) Patent No.: US 7,855,644 B2
(45) Date of Patent: Dec. 21, 2010

(54) METHOD AND APPARATUS FOR DISABLING AN ACTIVE DATA TAG DEVICE

(75) Inventors: Kenneth L. Greenlee, Raleigh, NC (US); Christian L. Hunt, Cary, NC (US); Steven M. Miller, Cary, NC (US); Anne I. Ryan, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/134,640

(22) Filed: Jun. 6, 2008

(65) Prior Publication Data

US 2009/0303061 A1 Dec. 10, 2009

(51) Int. Cl.
*G08B 13/14* (2006.01)
*H04Q 5/22* (2006.01)

(52) U.S. Cl. ............... 340/572.1; 340/572.3; 340/10.34; 340/10.5

(58) Field of Classification Search ............... 340/572.1, 340/572.3, 10.34, 10.5
See application file for complete search history.

(56) References Cited

U.S. PATENT DOCUMENTS

| | | | |
|---|---|---|---|
| 5,573,611 A * | 11/1996 | Koch et al. ............... | 152/152.1 |
| 6,025,780 A | 2/2000 | Bowers et al. | |
| 6,741,523 B1 | 5/2004 | Bommarito et al. | |
| 7,161,476 B2 | 1/2007 | Hardman et al. | |
| 7,212,955 B2 | 5/2007 | Kirshenbaum et al. | |
| 7,321,307 B1 | 1/2008 | Tow et al. | |
| 7,345,586 B2 * | 3/2008 | Black et al. ............... | 340/572.3 |
| 7,375,635 B2 | 5/2008 | Kessler | |
| 7,411,503 B2 | 8/2008 | Stewart et al. | |
| 7,548,164 B2 | 6/2009 | Guez et al. | |
| 2005/0116826 A1 | 6/2005 | Wertsebrger | |
| 2005/0127157 A1 * | 6/2005 | Stemmle et al. ............... | 235/377 |
| 2006/0187046 A1 | 8/2006 | Kramer | |
| 2007/0018832 A1 * | 1/2007 | Beigel et al. ............... | 340/572.7 |
| 2008/0084309 A1 * | 4/2008 | Posamentier ............... | 340/572.7 |
| 2008/0117050 A1 * | 5/2008 | Wu et al. ............... | 340/572.1 |
| 2008/0157974 A1 | 7/2008 | Boss et al. | |
| 2009/0040878 A1 | 2/2009 | Domes et al. | |

OTHER PUBLICATIONS

Karjoth, G., et al., "Disabling RFID Tags with Visual Confirmation: Clipped Tags are Silenced", IBM Research Report, Aug. 2005.
Campbell, A., "Clippable RFID Tags to Protect Consumers", RFID Weblog, Jan. 2006.
Schwartz, E., "IBM Clips RFID's Wings to Stop Private Data's Flight", Computerworld, Nov. 2006.
"Problems With RFID", technovelgy, LLC, viewed Feb. 5, 2008.

* cited by examiner

*Primary Examiner*—Jennifer Mehmood
(74) *Attorney, Agent, or Firm*—Patents On Demand, PA; Brian K. Buchheit

(57) ABSTRACT

The present invention discloses a data tag device (100) which initially operates in an active mode (304). The data tag device includes tag circuitry including a interface element (104), a controller element (102), and a memory (106) in which tag data (116) is stored. A battery (110) is provided which is initially coupled to the tag circuitry by a connector means (130) which allows non-destructive removal and replacement of the battery. The data tag device is configured to detect the removal of the battery (306, 308), and disable the data tag in response (310).

17 Claims, 3 Drawing Sheets

METHOD AND APPARATUS FOR DISABLING AN ACTIVE DATA TAG DEVICE

BACKGROUND OF THE INVENTION

The present invention relates to the field of data tag devices, and more particularly to data tag devices which may be operated initially in an active mode, and which are desired to be disabled upon completion of their intended use.

Data tag devices are in widespread use and are used to associate information with a particular item, object, or person. A data tag may be passive device which can only respond to queries from tag readers, and which receives power to provide the response from the query signal itself. Alternatively a data tag may be an active device, having its own power source allowing it occasionally broadcast an unsolicited beacon signal. There is also a semi-active mode of operation where the data has a power source to allow it to respond to queries with a stronger signal, allowing a greater distance between a reader and the data tag device. Semi-active data tags otherwise operate as passive data tags, and do not transmit unsolicited beacons.

Tags are used in a variety of industries including retail, transportation, medical/healthcare, and security, to name several. They are configured, accordingly, in a variety of form factors, as dictated by the particular application. Tags can be manufactured at such a low cost that they can be considered disposable in many applications. However, once a given tag's purpose has been fulfilled, it will persist, storing its data in a retrievable format indefinitely. Even active and semi-active tags may remain viable for years after being initially deployed because these tags use very little power.

The persistence of tag data, and the pervasiveness of tag usage have given rise to privacy concerns. Tags are typically concealed in packing materials, containers, products, and even integrated into these items, often without consumer knowledge. When these items are disposed of, the information in the tags may be obtained by third parties. This is particularly true of active tag devices since their beacons signal may be received without any ready query or solicitation. Similarly, semi-active tags can be read from a great distance than a passive tag, so their use is also of particular concern. Information relating to purchases, medicine, identity, even finances could potentially be obtained from tag devices. It is anticipated that tag usage will increase, resulting in an increase of the potential for unintended third parties to acquire tag data.

To ease concerns, some retailers will disable tags on items purchased at the point of sale. However, only those tags which can be disabled, and which are known to be present on a given product can be deactivated. However, deactivating tags at retail points of sale can obviously only affect tags used in retail practices. Disabling these tags adds an additional process at the point of sale, which is typically undesirable since it adds a cost in both equipment and time necessary to deactivate each tag. Furthermore, completely deactivating a tag at a point of sale may be undesirable for other reasons, such as warranty and return tracking, for example.

Another means for deactivating tags is for the consumer to use a so-called RFID zapper, which attempts to overload the circuits of the tag and destroy it as a result. A consumer may also simply destroy a tag to dispose of it. Of course, these methods assume the consumer both knows of the existence of the tag, and that the tag can reasonably be removed from the item with which it is associated.

Therefore there exists a need for a way to disable data tags to reduce the possibility that the tag information will be acquired by third parties.

BRIEF SUMMARY OF THE INVENTION

The invention provides in one embodiment a method of changing an operating mode of a data tag device. The data tag device has tag circuitry, and a battery or battery carrier configured to allow removal and replacement of a battery in a non-destructive manner. The battery provides power to the tag circuitry. The method commences operating the data tag device in an active mode while the battery is present in the data tag device. By present it is meant that the battery is coupled appropriately to the data tag device to provide power as intended. The method commences by removing the battery from the data tag device in a non-destructive manner. Upon removing the battery, the tag device commences detecting removal of the battery, and changing tag data stored on the data tag device in response to detecting the removal of the battery. Subsequently, the tag device commences ceasing operation of the data tag device in the active mode.

The invention, in another embodiment, provides a method of disabling a data tag device which has a battery configured to allow removal and replacement of the battery in a non-destructive manner. The battery provided power to the tag circuitry. The method commences by operating the data tag device in an active mode while the battery is present in the data tag device. While operating the active mode, the tag device, as performed by an appropriately configure controller, commences detecting removal of the battery from the data tag device. The battery is removed non-destructively. The controller then commences ceasing operation of the data tag device in the active mode in response to detecting removal of the battery.

In a further embodiment of the invention provides a data tag device which includes tag circuitry disposed on a main portion of the data tag device. The tag circuitry includes a controller and a memory element having tag data stored therein. A battery is coupled to the tag circuitry to provide a voltage to the tag circuitry. The battery is coupled to the tag circuitry in a manner that allows non-destructive removal of the battery. A connector is provided for removably coupling the battery to the tag circuitry. The controller is configured to detect removal of the battery, change tag data stored on the data tag device in response to detecting the removal of the battery, and cease operation of the data tag device in the active mode.

DETAILED DESCRIPTION OF THE INVENTION

Figure 1:
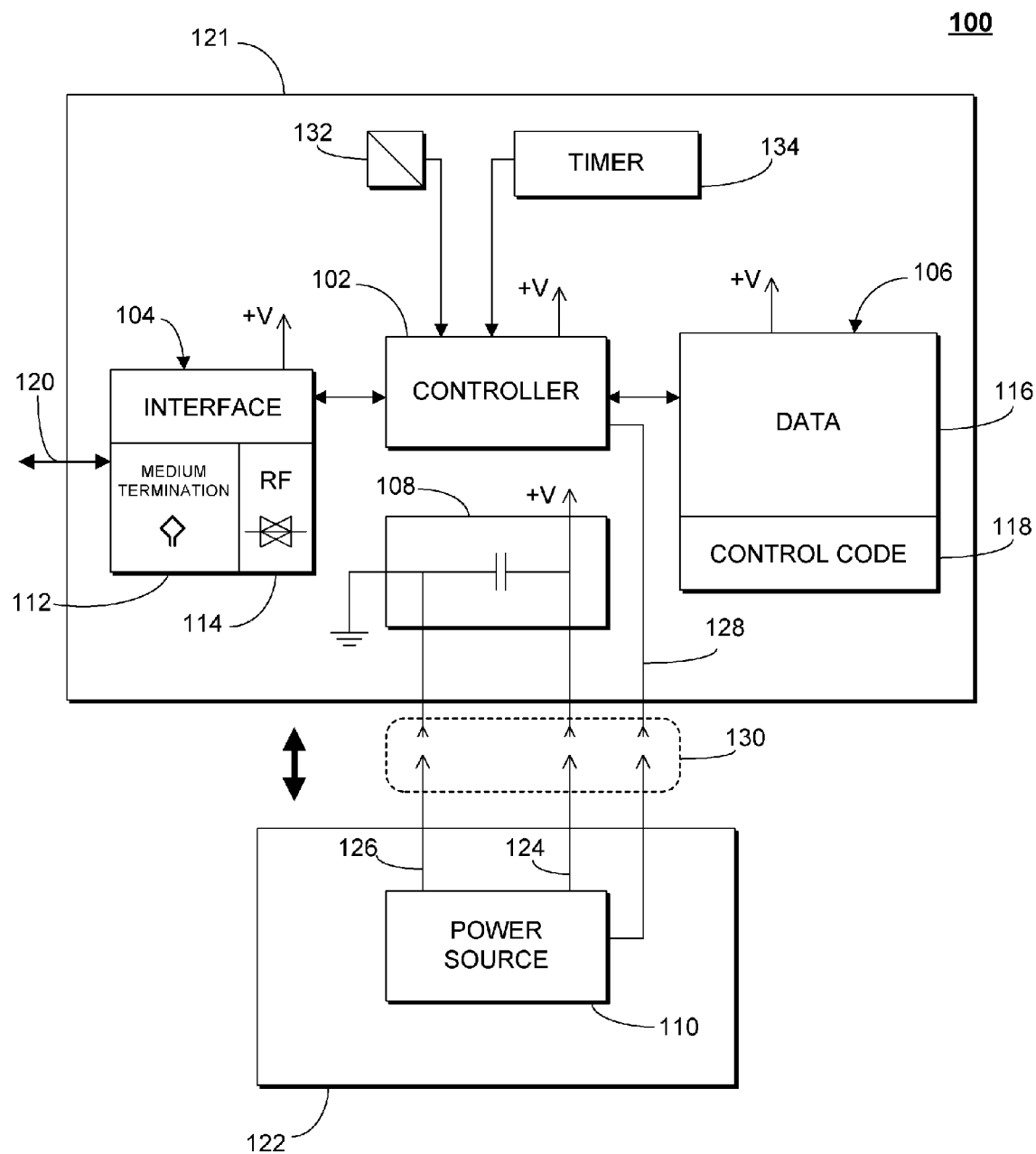
FIG. 1 is a block schematic diagram of a data tag device in accordance with an embodiment of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented at least in part in software, which includes but is not limited to firmware, resident software, microcode, etc.

Furthermore, the invention may be embodied as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The invention addresses the problem of data persistence in data tag devices by providing a means to disable the data tag to reduce the risk of tag data being acquired by unintended parties. According to the invention, a data tag operates in an active mode until a battery connection to the tag circuitry is disabled by a non-destructive means under control of a user. The battery is removable and replaceable. The battery may be removed by a user when active operation of the tag device is no longer needed or desired. The removal of the battery may be performed by observing a voltage level on one or more lines from the battery at the tag circuitry. A sustaining circuit may be used to provide sufficient operating charge and voltage once the battery is removed to complete the method of disabling the tag device. Once removal of the battery is detected, a controller of the tag device may change, erase, or add to tag data stored in a memory of the tag device.

FIG. 1 is a block schematic diagram of a data tag device 100 in accordance with an embodiment of the invention. The data tag device is used to store data, and physically associate that data with some object. The tag is typically made to be disposable, and may be permanently or semi-permanently mounted on the object or object packaging. A tag may be removably attached to an object for a temporary association, as well. The data tag device of the present invention initially operates in an active mode. The data tag device includes tag circuitry including a controller 102, an interface 104, and a memory element 106. Those skilled in the art will appreciate that the grouping of elements shown here, by function, does not necessarily represent how the elements would be grouped physically. Tag circuitry is typically realized on a single integrated circuit chip. The controller 102 is a computing and logic component which executes instructions or programming designed to carry out the functions of the data tag, such as recognizing received queries, generating beacons in the case of active data tags, and fetching data from the memory, for example, and including the processes, methods, and operations described herein with regard to operation of the inventive data tag device. Typically, due to the low level of sophistication needed, the controller need not be on the order of a microprocessor, and may instead use dedicated logic which is responsive to a small number of events.

The controller is coupled to an interface element 104 which provides a means of communicating with other devices. The interface element includes a medium termination 112, such as an antenna for wireless communication. Other terminators may be used, such as, for example, an electrical connector, although most tag devices operate wirelessly. A communication circuit 114 is coupled to the termination 112, and converts signals received via the termination to a form usable by the controller 102. Furthermore, the communication circuit receives data signals from the controller and converts them into a form for transmission over the media 120 via the termination 112. In one embodiment of the invention the communication circuit 114 is a radio frequency (RF) transceiver which coverts received radio frequency signals into data signals, and vice-versa, as is known.

The controller is further coupled to a memory element 106, which contains at least a tag data section 116 for storing tag data. The memory element is a machine readable storage medium. The memory element may also contain additional information, such as, for example, control code 118. The control code may include instruction code for operating the controller, as well as operational parameters.

According to the present embodiment the tag circuitry may include a power conditioning or voltage sustaining circuit 108 which is coupled to a power source or battery 110. In one embodiment of the inventive data tag, the tag circuitry is disposed on a main portion 121 while the battery is disposed on a removable portion 122. The removable portion may be removed form the data tag device in a non-destructive manner, and such that it may be replaced subsequently. The battery may be coupled to the tag circuitry by a supply line 124, a ground line 126, and a sense line 128 may also be used. A connection interface 130, such as a connector, is used to facilitate the non-destructive removal and reconnection of the battery by operation of a user. The ground line establishes a reference potential for the tag circuitry, and the supply line provides an operating potential +V, which may be the raw battery voltage. When the removable portion is removed from tag device, the controller senses a change in voltage, and undertakes a process in response. The controller may, for example, erase or wipe some or all of the tag data. The sustaining circuit 108 comprises a capacitance to store charge sufficient to provide voltage to the tag circuitry once the battery is disconnected. However, due to use of the charge by the tag circuitry, as well as parasitic parallel resistance, once the battery is disconnected, the electric charge in the capacitance will become depleted, cause the supply voltage +V to drop at a rate substantially faster than the battery voltage would drop during normal operation. A variety of means maybe used to detect the quicker voltage drop of +V once the battery is disconnected, including an analog to digital converter, a comparator circuit with another capacitance in one leg of the comparator circuit, and so on. Alternatively, a sense line 128 may be provided which has no voltage sustaining feature, and upon disconnecting the battery, the sense line voltage will drop very rapidly.

The tag circuitry may further include sub-circuits such as an environmental sensor 132, and a timer 134. The sensor 132 may be used to collect environmental data, such as, for example, temperature, humidity, luminance, and so on. This data may be periodically sampled and stored in the tag memory as tag data. Furthermore, upon the battery being removed from the data tag device, in addition controller may sample the sensor to acquire data at the time of battery removal, and store the new data in addition to other tag data. Similarly, since the data tag device is operated in an active mode, where the data tag device will typically transmit beacon signals are regular intervals, a timer 134 may be used to track time and determine event occurrence times. Upon removal of the battery, the controller may acquire a timestamp of the removal time as new data to be added to the tag data. Alternatively, the timer may simply be a free running counter, and a clock value or counter value may be acquired upon removal of the battery and stored as new tag data.

Figure 2:
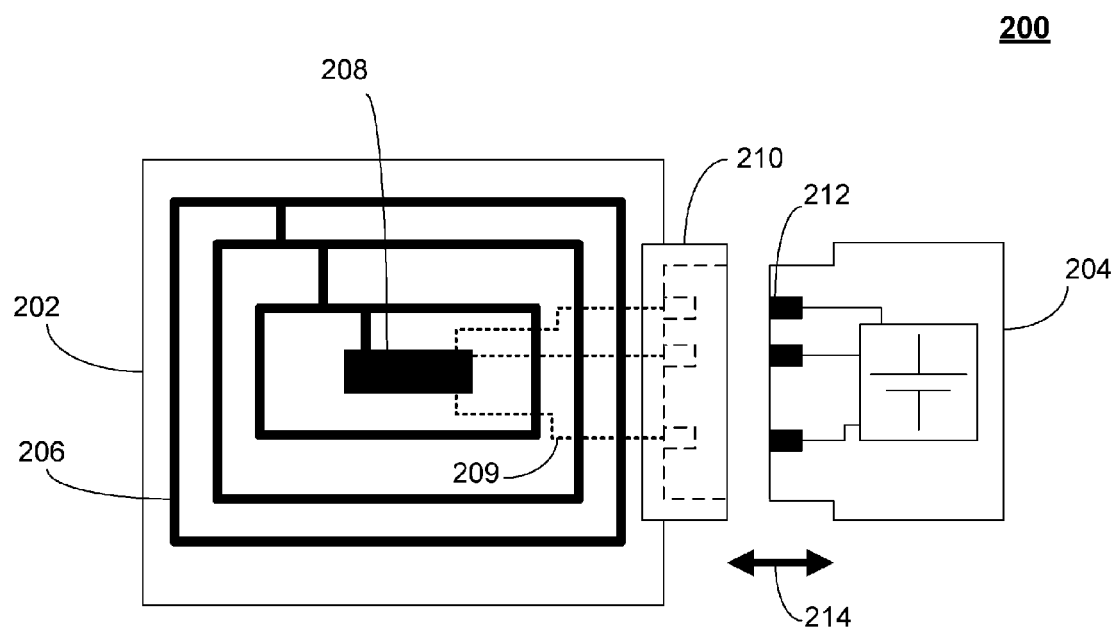
FIG. 2 is a diagram of a data tag device having a removable battery module, in accordance with an embodiment of the invention.

FIG. 2 shows a diagram of a data tag device 200 having a removable portion 204, in accordance with an embodiment of the invention. The removable portion 204 may be a battery module which carries a battery and electrical connection features to couple the battery to the tag circuitry in a manner that allows the non-destructive removal of the battery from the data tag device. It also allows for simple replacement of the battery module. The tag circuitry may be disposed on a main portion 202 of the data tag device. The main portion may include an antenna 206 coupled to a tag chip 208, which includes tag circuitry such as the interface, controller, and memory elements. A simple connecter 210 may be provided on the main portion. The connector may be a socket or card type connector into which an edge or portion of the battery module is inserted, or removed, as indicated by arrow 214. Conductive pads such as pad 212 mate with corresponding pads upon insertion of the module into the connector. Conductive runners such as runner 209 connect the pads of the connector to the tag chip. The conductive runners are shown here in dashed line to indicate they are on a different layer of the main portion than the antenna. Those skilled in the art will appreciate that the battery may be removably provided in a variety of ways, including a simple battery cell holder which can hold one or more battery cells. Different connectors may be used as well, as is known.

Figure 3:
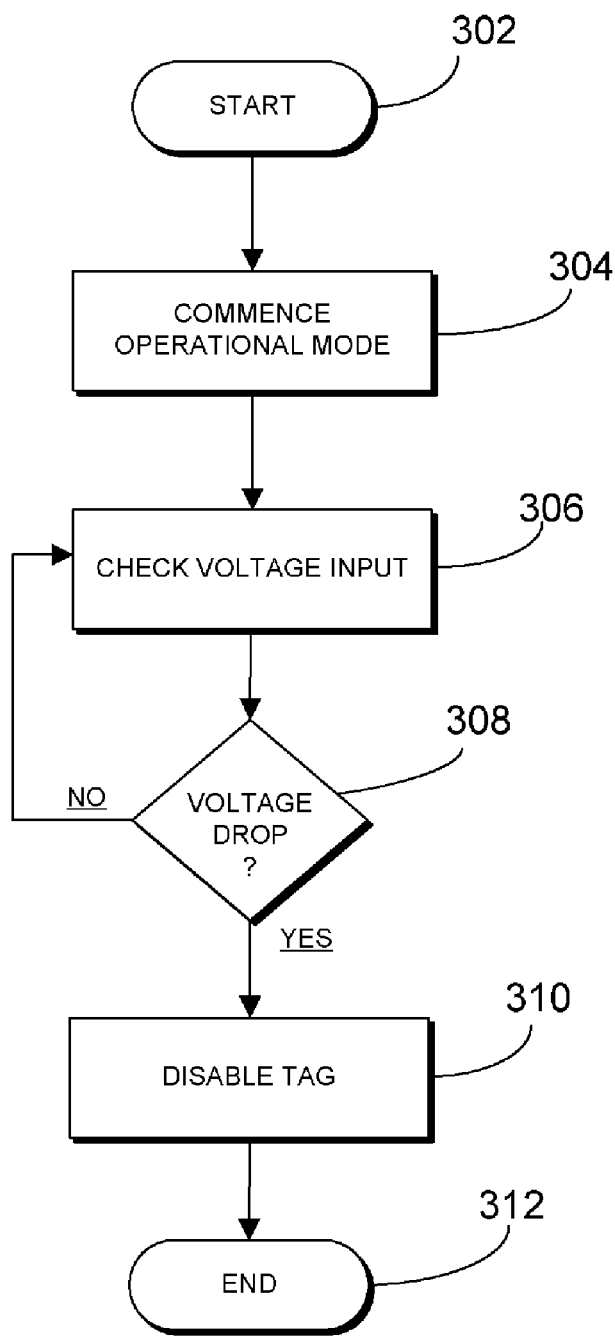
FIG. 3 is a flow chart diagram of a method of disabling a data tag, in accordance with an embodiment of the invention.

FIG. 3 shows a flow chart diagram 300 of a method for disabling a tag device, in accordance with the invention. At the start 302, the tag device has been provided with a battery which is initially coupled to the tag circuitry, such as by a battery module that is removably coupled to the data tag device. The battery is provided in a manner such that it may be removed non-destructively, and it may be replaceable. Upon initialization, the controller is configured to commence an active mode where the data tag device may periodically transmit a beacon. Upon becoming operational, the tag device commences a process of detecting the removal of the battery from the tag circuitry. The battery may be removed by a user when active operation of the data tag device is no longer desired. To detect the removal of the battery, the tag device may observe a voltage level for a voltage drop indicative of the battery being removed from the data tag device (606, 608). Upon detecting the removal of the battery from the data tag device, the data tag device commences disabling the tag (610). Upon disabling itself, the tag ceases the active operating mode. The tag may further disable itself by erasing some or all of the tag data. The tag may subsequently operate in a passive mode, where it responds to queries, but requires being powered by the query signal, or the tag may cease operation completely. Upon the tag disabling itself, the method terminates (612). Generally, the controller is configured, via executable code, to operate the tag device initially in an active mode. It is further configured to, while operating in the active mode, detect removal of the battery, such as my detecting a voltage drop on the supply line. The controller is also configured to, upon detecting removal of the battery, cease operation in the active mode, such as by subsequently operating in a passive mode. Furthermore, the controller may be configured to erase tag data, add new data to the tag data, or both. New tag data may be produced by a timer, or a time stamp, or an environmental sensor, or any combination thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of changing an operating mode of a RFID data tag device, the data tag device having tag circuitry and a battery carrier configured to allow removal and replacement of a battery in a non-destructive manner, the battery providing power to the tag circuitry, the method comprising:
    operating the data tag device in an active mode while the battery is present in the data tag device;
    removing the battery from the battery from the data tag device non-destructively;
    detecting removal of the battery from the data tag device;
    changing tag data stored on the data tag device in response to detecting the removal of the battery; and
    ceasing operation of the data tag device in the active mode and then operating the data tag device in a passive mode.

2. A method of changing an operating mode of a data tag device as defined in claim 1, wherein changing tag data comprises erasing at least a portion of the tag data.

3. A method of changing an operating mode of a data tag device as defined in claim 1, wherein detecting removal of the battery comprises detecting a voltage drop on a battery line of the data tag device.

4. A method of changing an operating mode of a data tag device as defined in claim 1, wherein detecting removal of the battery comprises detecting a voltage drop on a sense line of the data tag device relative to a battery line.

5. A method of changing an operating mode of a data tag device as defined in claim 1, wherein ceasing operation of the data tag device comprises ceasing all tag operation.

6. A method of changing an operating mode of a data tag device as defined in claim 1, wherein changing the tag data includes adding new tag data related to detecting removal of the battery.

7. A method of changing an operating mode of a data tag device as defined in claim 6, wherein the new tag data includes at least one of a timer value, a timestamp, or environmental data acquired from a sensor of the data tag device.

8. A method of changing an operating mode of a data tag device as defined in claim 1, wherein removing the battery comprises removing a battery module which mates with a connector of the data tag device.

9. A method of disabling a RFID data tag device and changing an operating mode of the data tag device having a battery configured to allow removal and replacement of the battery in a non-destructive manner, the battery providing power to the tag circuitry, the method comprising:
    operating the data tag device in an active mode while the battery is present in the data tag device;
    detecting removal of the battery from the data tag device in response to a user removing the battery, wherein the battery is removed non-destructively; and
    ceasing operation of the data tag device in the active mode in response to detecting removal of the battery operating the data tag device in a passive mode subsequent to ceasing operation of the active mode.

10. A method of disabling a data tag device as defined in claim 9, further comprising changing at least a portion of tag data stored in the data tag device in response to detecting removal of the battery, performed prior to ceasing operation of the data tag device.

11. A method of disabling a data tag device as defined in claim 10, wherein changing the portion of tag data comprises erasing the portion of tag data.

12. A method of disabling a data tag device as defined in claim 10, wherein changing the portion of tag data comprises adding new tag data related to detecting removal of the battery.

13. A method of disabling a data tag device as defined in claim 12, wherein the new tag data includes at least one of a timer value, a timestamp, or environmental data acquired from a sensor of the data tag device.

14. A method of disabling a data tag device as defined in claim 9, wherein detecting removal of the battery comprises detecting a voltage drop on a battery line of the data tag device.

15. A RFID data tag device, comprising:
    tag circuitry disposed on a main portion of the data tag device, the tag circuitry including a controller and a memory element having tag data stored therein;
    a battery coupled to the tag circuitry to provide a voltage to the tag circuitry while coupled to the tag circuitry, wherein the battery is coupled to the tag circuitry in a manner that allows non-destructive removal of the battery; and a connector for removably coupling the battery to the tag circuitry;

wherein the controller is configured to:

detect removal of the battery;

change tag data stored on the data tag device in response to detecting the removal of the battery; and cease operation of the data tag device in the active mode and then operating the data tag device in a passive mode.

16. A data tag device a defined in claim 15, wherein the controller, being configured to change tag data upon detecting the removal of the battery, is further configured to erase at least a portion of the tag data.

17. A data tag device a defined in claim 15, wherein the controller, being configured to change tag data upon detecting the removal of the battery, is further configured to add new tag data related to the removal of the battery.

* * * * *